United States Patent Office 3,236,782
Patented Feb. 22, 1966

3,236,782
PROCESS REGENERATION OF MIXED METALLIC OXIDE CATALYSTS BY CONTACTING WITH METAL COMPOUND VAPOR
Theodore A. Koch, Wilmington, Del., assignor to E. I. du Pont de Nemours and Company, Wilmington, Del., a corporation of Delaware
No Drawing. Filed Sept. 26, 1962, Ser. No. 226,455
7 Claims. (Cl. 252—411)

This invention relates to a method for regenerating a catalyst. More particularly this invention relates to a method for regenerating a catalyst used to catalyze a vapor phase oxidation reaction.

Catalytic compositions which comprise a plurality of combined metallic oxides, at least one of which oxides is an oxide of chromium, vanadium, molybdenum or tungsten, generally have been found to be useful in catalyzing the various vapor phase oxidation reactions. Most of thees catalysts are not definite chemical compositions, but rather are composed of two or more different metallic oxides which are combined in some manner. Such catalysts are most commonly prepared by coprecipitating the oxides, by fusing a mixture of the oxides or by other methods familiar in the art.

The term "metallic oxides" refers to the oxides of all the elements normally considered to be metals or the so-called semi-metals, namely, those elements in the following groups of the Periodic Chart of Elements: Group I-A (except hydrogen), Group II-A, Group V-B, Group VI-B, Group VIII, Group I-B, Group II-B; also members of the lanthanide series and the actinide series; and also aluminum, gallium, indium, thallium, germanium, tin, lead, antimony, bismuth and polonium.

The catalysts involved in this invention contain at least one oxide of a metal selected from the group consisting of chromium, vanadium, molybdenum, and tungsten, and often catalysts are used which consist solely of two of these oxides, for example, a vanadium oxide combined with a molybdenum oxide. The other most commonly used catalysts comprise at least one metallic oxide selected from the group consisting of chromium, vanadium, molybdenum and tungsten oxides, combined in some manner with at least one metallic oxide selected from the group consisting of magnesium, calcium, strontium, barium, iron, nickel, copper, silver, gold, zinc, cadmium, aluminum, indium, thallium, tin, lead, antimony, bismuth, cerium, and thorium oxides, with the most generally preferred members of this latter group being the magnesium, calcium, strontium, iron, nickel, copper, zinc, cadmium, tin, lead, antimony, and bismuth oxides.

The relative proportions of the components of these catalysts vary depending on the particular catalyst employed, the particular vapor phase oxidation reaction in which it is used, process conditions and so forth. The specific useful catalytic compositions are well known in the art, for example, Hartig, U.S.P. 2,625,519, Koch et al., U.S.P. 3,065,264 and copending application Koch, application Serial No. 226,454, filed September 26, 1962, disclose various catalysts composed of molybdenum oxide combined with certain other metallic oxides which are useful in several olefin vapor phase oxidation reactions. These cited references teach that under the conditions shown therein, the atomic ratio of molybdenum to the other metal present should be at least 1:1.

Although many of these catalysts function well enough to have been selected for use in many commercial vapor phase oxidation reaction processes, these catalysts have rather limited catalytic lives and therefore are not entirely satisfactory. During the course of the reaction there is usually a decrease in the catalytic activity of the catalyst, that is, a decrease in the percent conversion of the essential starting material which is sometimes, but not always, accompanied by a decrease in the percent yield of the desired product. This loss in catalytic activity is unrelated to the normal catalyst fouling encountered where a catalyst is used over an extended period of time. Such fouling is the result of accumulation of deleterious materials or residues such as carbon which may be removed by burning in air, or lead deposits which may be removed by acid treatment and other such residues. This loss of catalytic activity often occurs before there is any appreciable amount of fouling and procedures which normally revive a fouled catalyst fail to regenerate these catalysts after a loss of catalytic activity has occurred. Also this loss of catalytic activity is distinguished from the type of catalyst degradation which is remedied by the addition of a transitory reaction modifier, for example, the addition of a halogen in the copper catalyzed oxidation of propylene to acrolein as shown in U.S.P. 2,879,300. Similar treatment of these catalysts fails to restore these catalysts to useful catalytic activity. Furthermore, this loss of catalytic activity is not the result of a removal of a critical catalyst component. Quantitative analysis of these catalysts, after a loss in catalytic activity has occurred, does not reveal any perceptible loss of any of the critical components thereof. The exact cause or nature of this loss of catalytic activity is not known. During the course of the vapor phase oxidation reaction, the catalytic activity unexplainably decreases. It is speculated that this phenomenon may be the result of a development of certain surface deficiencies. No completely satisfactory method for regenerating these catalysts has heretofore been described. Certainly, there has been no method previously proposed whereby these catalysts may be conveniently regenerated in situ in the reactor without shutting down or otherwise disrupting the reaction process. It has heretofore been the customary practice in most commercial vapor phase oxidation operations to shut down the process when the catalytic activity of the catalyst decreases to an undesirable level, remove the catalyst from the reactor and then treat it in some manner, usually by pulverizing followed by repelletizing. This procedure is both time consuming and costly.

An object of this invention is to provide a method for regenerating a vapor phase oxidation reaction catalyst which comprises a plurality of metallic oxides at least one of said metallic oxides being an oxide of a metal selected from the group consisting of chromium, vanadium, molybdenum and tungsten. Another object is to provide a method for regenerating such a catalyst in situ in a vapor phase oxidation reaction process without disrupting the said process.

These and other objects are attained by the method for regenerating a catalyst used to catalyze a vapor phase oxidation reaction said catalyst comprising a plurality of combined metallic oxides, at least one of the said metallic oxides being an oxide of a metal selected from the group consisting of chromium, vanadium, molybdenum and tungsten, said catalyst being characterized as exhibiting a decrease in effective catalytic activity during the course of the said reaction, the said method comprising introducing into contact with the said catalyst the vapor of a compound of the said metal selected from the group consisting of chromium, vanadium, molybdenum, and tungsten which is the same metal as is present in the said catalyst as one of the combined metallic oxides, said vapor being introduced in an amount sufficient to effect the regeneration of the said catalyst.

The aforementioned compound of chromium, vanadium, molybdenum or tungsten which is contacted with the catalyst in the practice of this invention (which is referred to hereinafter for brevity as "the compound"), may be any compound which is either volatile or is water soluble and will form a fine mist when in water solution. Thus the oxides, chlorides (and other halides), oxychlorides, ammonium salts of the chlorides, nitrates, sulfates, and so forth will regenerate these catalysts. Many of these salts and other compounds actually are converted to oxides when subjected to the elevated temperatures and oxidation atmospheres of the vapor phase oxidation reactions. Because many of the salts and other compounds tend to promote corrosion of the process equipment, it is generally preferred to use an oxide.

The manner in which the aforesaid compound may be introduced into contact with the catalyst varies widely. The compound may be volatilized and introduced directly without dilution, or it may be introduced in a vapor mixture with suitable inert gases such as nitrogen. If the particular vapor phase reaction involved can tolerate the presence of water, the compound may be dissolved in water and this solution may then be introduced as a vapor or a fine mist. A very convenient method which may be used when the vapor oxidation reaction is carried out in a fixed or static catalyst bed reactor at high temperature (i.e., above 350° C.) is to simply place pellets of the required metallic oxide in the reactor upstream from the catalyst bed. These oxide pellets will slowly vaporize and the vapor thereof will contact the catalyst and thereby maintain the catalytic life of the catalyst by, in effect, continually regenerating the catalyst.

The exact amount of the compound that must be contacted with the catalyst to effect the regeneration thereof, depends on several variables including the particular vapor phase oxidation reaction involved, the particular catalyst used and the precise process conditions. Normally relatively small amounts of the compound are required. For example, it will be appreciated that molybdenum oxide is only very slightly volatile even at elevated temperatures, but when pellets of molybdenum oxide are placed in a fixed bed reactor upstream from a molybdenum oxide catalyst used to catalyze a vapor phase oxidation reaction, the small amount of the molybdenum oxide which vaporizes is sufficient to maintain the useful catalytic life of the catalyst. There evidently is no harm done by introducing excessive amounts of the compound into contact with the catalyst, since large amounts of the compounds do not cause any catalyst degeneration or other deleterious effects. However, in view of economic considerations only a sufficient amount of the compound as is required to effect the catalyst regeneration is normally introduced. The amount of the compound required to effect the catalyst regeneration is determined by trial and practical experience for each vapor phase oxidation reaction process.

The following examples serve to illustrate preferred embodiments of this invention. In each of these examples the apparatus used is an externally cooled, one-half inch internal diameter, stainless steel tubular reactor containing a fixed catalyst bed.

*Example I*

A vapor mixture of propylene, oxygen and water in a mol ratio of 2:1:3 (propylene:oxygen) is fed continuously at a feed rate of 4 liters of vapor per 100 grams of catalyst per minute into the reactor containing a precipitated catalyst composed of oxides of molybdenum and calcium in a mol ratio of 1.05:1 (molybdenum:calcium). This catalyst (and the catalyst shown in Examples II through IX) is prepared as taught in the aforementioned copending application Serial No. 226,454. The reaction zone temperature is maintained at 450° C. After two hours of operation, analyzation of a sample of the product effluent stream shows a conversion of 27% propylene to yield 69% of acrolein based on the propylene consumed. During a period of 200 hours of operation there is observed a continuous drop in conversion of propylene to 13% and a yield of 53% acrolein. A vaporized water solution containing 0.004% $MoO_3$ is added to the inlet vapor feed stream and is introduced into the reactor for 6½ hours at a rate of 0.5 ml./min. One hour after this $MoO_3$ solution feed has been stopped, the conversion of propylene is 27% and the yield of acrolein is 64%.

*Example II*

Example I is repeated except that the reactor contained 8 grams of molybdic oxide pellets upstream from the catalyst bed. After more than 200 hours of continuous operation there is no perceptible decrease in conversion or yield.

*Example III*

Example I is repeated using a precipitated catalyst composed of oxides of molybdenum, magnesium and bismuth (a promoter) in a mol ratio of 1.05:1:0.05 (molybdenum:magnesium:bismuth). Similar results are obtained.

*Example IV*

Example I is repeated using a precipitated catalyst composed of oxides of molybdenum, strontium and bismuth in a mol ratio of 1.05:1:0.05 (molybdenum:strontium:bismuth). Similar results are obtained.

*Example V*

Example I is repeated using a precipitated catalyst composed of oxides of molybdenum, barium and bismuth in a mol ratio of 1.05:1:0.05 (molybdenum:barium:bismuth). Similar results are obtained.

*Example VI*

A vapor mixture of isobutylene, oxygen and water in a mol ratio of 1.1:1:6.3 (isobutylene:oxygen:water) is fed continuously at a feed rate of 6 liters of vapor per 100 grams of catalyst per minute into the reactor containing a precipitated catalyst composed of oxides of molybdenum, calcium and bismuth in a mol ratio of 1.1:1:0.1 (molybdenum:calcium:bismuth). The reaction zone temperature is maintained at 550° C. After two hours of operation, analyzation of a sample of the product effluent stream shows a conversion of 45% of the isobutylene to yield 67% methacrolein based on the isobutylene converted. After 220 hours of operation there is observed a drop in the conversion of isobutylene to 9% and a 64% yield of methacrolein. A vaporized water solution containing 0.05% $MoO_3$ is added to the inlet vapor feed stream and is introduced into the reactor for 6 hours at a rate of 0.5 ml./min. One hour after this $MoO_3$ solution feed has been stopped, the conversion of isobutylene is 46% and the yield of methacrolein is 66%.

*Example VII*

Example VI is repeated using a precipitated catalyst composed of oxides of molybdenum, magnesium and bismuth in a mol ratio of 1.1:1:0.1 (molybdenum:calcium:bismuth). Similar results are obtained.

*Example VIII*

Example VI is repeated using a precipitated catalyst composed of oxides of molybdenum, strontium and bismuth in a mol ratio of 1.1:1:0.1 (molybdenum:strontium:bismuth). Similar results are obtained.

*Example IX*

Example VI is repeated using a precipitated catalyst composed of oxides of molybdenum, barium and bismuth in a mol ratio of 1.1:1:0.1 (molybdenum:barium:bismuth). Similar results are obtained.

*Example X*

A vapor mixture of air and methanol in a mol ratio of 8:1 (air:methanol) is fed continuously at a feed rate of 9 liters of vapor per minute per 100 grams of catalyst into the reactor containing an iron-molybdenum catalyst composed of $Fe_2O_3$ and $MoO_3$ in a mol ratio of 1:5 prepared in accordance with U.S.P. 1,913,405. The reaction zone is maintained at 375° C. Analyzation of the product effluent gas stream after two hours of operation shows a methanol conversion of 98% to yield 92% formaldehyde based on the methanol converted. After 62 days of operation a sample of the product stream shows a drop in the conversion to 95% and a formaldehyde yield of 86%. A vaporized water solution containing 2% $MoO_3$ is introduced into the reactor at a rate of 0.5 ml./min. and continued for four hours while maintaining the same feed rate of air and methanol. One hour after the addition of this $MoO_3$ solution has ceased, analysis of a product sample shows a 98% conversion of methanol to yield 92% formaldehyde.

*Example XI*

Example X is repeated except that to regenerate the catalyst a vaporized water solution containing 0.5% molybdenum oxytetrachloride ($MoOCl_4$) is introduced into the reaction zone. Similar results are obtained.

*Example XII*

Example X is repeated except that to regenerate the catalyst a gas stream of nitrogen is passed through a chamber packed with crystals of molybdenum carbonyl ($Mo(CO)_6$) maintained at 125° C. and is thence introduced into the reactor at a rate of 0.22 liters af vapor per minute for 6 hours. Similar results are obtained.

*Example XIII*

A vapor mixture of 5% by volume of butene in air is fed continuously at a space velocity of 1200 hour$^{-1}$ into the reactor containing 74 grams of a precipitated catalyst composed of oxides of cobalt, molybdenum, and vanadium, prepared as shown in Example III of U.S.P. 2,625,519. A butene conversion of 18% to yield 27% maleic anhydride is found initially, but after 18 hours of continuous operation the butene conversion is 13% and the maleic anhydride yield is 26%. A vaporized water solution containing 0.5% ammonium molybdate and 0.005% ammonium metavanadate is injected into the inlet feed stream for 10 minutes at a rate of 0.42 ml. of solution per minute. The amount of maleic acid formed as a result of the added water is negligible. Analysis of a sample of the product effluent stream one hour after the solution feed is discontinued shows a butene conversion of 17% and a maleic anhydride yield of 27%.

*Example XIV*

A vapor mixture of oxygen and naphthalene in a mol ratio of 28:1 (oxygen:naphthalene) is fed continuously at a space velocity of 2500 hour$^{-1}$ into the reactor containing 50 grams of a 4–8 mesh particle size tin-vanadium catalyst composed of oxides of tin and vanadium in a mol ratio of 1:1.05 (tin:vanadium) prepared according to the directions shown in British Patent 228,771 and further discussed by Maxted in the Journal of the Society of Chemical Industry, vol. 47, pp. 101–105 (1928). During the first to second hour of operation there is obtained an average yield of 72% (i.e., 72% of the theoretical amount of phthalic anhydride is recovered) but in the 26th to 27th hours of operation there is an average yield of 52%. Vaporized vanadium oxychloride ($VOCl_3$) is added to the naphthalene feed stream to give an addition of 0.2 grams of this compound over a 10 minute period. The average yield is 63% during the 28th to 29th hours of operation.

*Example XV*

A vapor mixture of carbon monoxide and air in a volume ratio of 1:8 (CO:air) is fed continuously at a space velocity of 1600 hour$^{-1}$ into the reactor containing a copper-chromium precipitated catalyst composed of oxides of copper and chromium in a mol ratio of approximately 1:2 (copper:chromium) prepared as shown in U.S.P. 2,031,475. The reaction zone temperature was maintained at 550° C. Initially 97% of the CO is oxidized to $CO_2$ but after four weeks of operation only 86% of the CO is oxidized to $CO_2$. A 5% aqueous solution of $CrO_3$ is injected into the inlet feed stream as a fine mist to give an addition of 1.3 cc. of this solution over a 10 minute period. One hour after the solution of $CrO_3$ is injected into the inlet feed stream 96% of the CO is oxidized to $CO_2$.

*Example XVI*

A vapor mixture of toluene, oxygen and water in a mol ratio of 2:1:6 (toluene:oxygen:water) is fed continuously at a feed rate of 0.5 liter of vapor per 100 grams of catalyst per minute into the reactor containing a catalyst composed of combined oxides of tin and tungsten in a mol ratio of 1:1.2 (tin:tungsten), prepared in a manner similar to the preparation of tin-vanadium catalysts as shown in British Patent 237,688 and discussed by Maxted and Dunsly, Chemical Society Journal (London), 1928, pp. 1439–42. The reaction zone is maintained at 450° C. During the 25th and 30th minutes of operation there is an average toluene conversion of 17% to yield 46% benzaldehyde based on the toluene converted. During the 450th to 470th minutes of operation the average toluene conversion is 12% and the yield of benzaldehyde is 42%. A vaporized 2% water solution of ammonium tungstate is injected into the inlet feed stream in an amount of 50 ml. of liquid solution over a 10 minute period. During the 500th to 520th minutes of operation the average toluene conversion is 17% to yield 45% benzaldehyde.

This invention has been described in considerable detail, but since it is obvious that many modifications and variations of these details can be made without departing from the spirit and scope of this invention, it is to be understood that this invention is not to be limited except as defined by the appended claims.

I claim:

1. In a continuous process of reacting hydrogen-containing carbon compounds in the vapor phase with oxygen over a quantity of solid catalyst subject to abatement in activity with continued use and consisting essentially of oxides of (I) at least one component metal of a group (A) consisting of chromium, vanadium, molybdenum and tungsten and (II) at least one other component metal of a group (B) consisting of metals of Groups I, II, IV–A, V–A, and VIII of the periodic table, the atomic ratio of component metal of said group (A) to component metal of said group (B) being at least about 1:1, the improvement which comprises contacting said catalyst, in the course of said reacting, with a further quantity of at least one said group (A) component metal present in said catalyst, in the form of a vapor of a compound of said group (A) component metal, whereby said abatement in activity of said catalyst with continued use is minimized.

2. Process according to claim 1 wherein said compound of component metal of group (A) is an oxide.

3. Process according to claim 2 wherein said component metal of group (A) is molybdenum.

4. Process according to claim 3 wherein said catalyst consists essentially of oxides of component molybdenum and component metal from the group consisting of magnesium, calcium, strontium and barium.

5. In a continuous process of reacting propylene in the vapor phase with oxygen to yield acrolein over a quantity of solid catalyst subject to abatement in activity with continued use and consisting essentially of oxides of component molybdenum and component other metal from the group consisting of magnesium, calcium, strontium, and barium, the atomic ratio of said molybdenum to said other metal being at least about 1:1, the improvement which comprises contacting said catalyst, in the course of said reacting, with a further quantity of molybdenum oxide in the form of a vapor, whereby said abatement in activity of said catalyst with continued use is maintained.

6. In a continuous process of reacting isobutylene in the vapor phase with oxygen to yield methacrolein, over a quantity of solid catalyst oxide subject to abatement in activity with continued use and consisting essentially of oxides of component molybdenum and component other metal from the group consisting of magnesium, strontium, and barium, the atomic ratio of said molybdenum to said other metal being at least about 1:1, the improvement which comprises contacting said catalyst, in the course of said reacting, with a further quantity of molybdenum oxide in the form of a vapor, whereby said abatement in activity of said catalyst with continued use is minimized.

7. In a continuous process of reacting methanol in the vapor phase with oxygen to yield formaldehyde over a quantity of solid catalyst subject to abatement in activity with continued use and consisting essentially of oxides of component molybdenum and component iron, the atomic ratio of said molybdenum to said iron being at least about 1:1, the improvement which comprises contacting said catalyst, in the course of said reacting, with a further quantity of molybdenum oxide in the form of a vapor, whereby said abatement in activity of said catalyst with continued use is minimized.

References Cited by the Examiner
UNITED STATES PATENTS

| | | | |
|---|---|---|---|
| 2,579,123 | 12/1951 | Pardee | 252—412 |
| 2,734,874 | 2/1956 | Drake et al. | 252—461 |
| 2,812,310 | 11/1957 | Walker et al. | 252—411 |
| 2,831,752 | 4/1958 | Luckey et al. | 252—411 |
| 2,846,488 | 8/1958 | Miller | 252—466 |
| 2,973,326 | 2/1961 | Hodgins et al. | 252—412 |
| 3,117,936 | 1/1964 | Michalko | 23—2 X |
| 3,168,368 | 2/1965 | Mills | 23—2 |

MAURICE A. BRINDISI, *Primary Examiner.*

UNITED STATES PATENT OFFICE
CERTIFICATE OF CORRECTION

Patent No. 3,236,782　　　　　　　　　　　　　　February 22, 1966

Theodore A. Koch

It is hereby certified that error appears in the above numbered patent requiring correction and that the said Letters Patent should read as corrected below.

Column 1, line 20, for "thees" read -- these --; column 3, line 61, for "(propylene:oxygen)" read -- (propylene:oxygen:water) --; column 6, line 75, for "maintained" read -- minimized --; column 7, line 6, after "magnesium," insert -- calcium, --.

Signed and sealed this 7th day of February 1967.

(SEAL)
Attest:

ERNEST W. SWIDER　　　　　　　　　　　　　　EDWARD J. BRENNER
Attesting Officer　　　　　　　　　　　　　　Commissioner of Patents